US012018649B2

(12) United States Patent
Nagel et al.

(10) Patent No.: US 12,018,649 B2
(45) Date of Patent: Jun. 25, 2024

(54) APPARATUS FOR AND METHOD OF DETECTING ONE OR MORE PROPERTIES OF A ROTOR BLADE DURING OPERATION OF A WIND TURBINE

(71) Applicant: Siemens Gamesa Renewable Energy A/S, Brande (DK)

(72) Inventors: Eirik Nagel, Flensburg (DE); John Nieuwenhuizen, Horsens (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 270 days.

(21) Appl. No.: 17/442,738

(22) PCT Filed: Mar. 17, 2020

(86) PCT No.: PCT/EP2020/057274
§ 371 (c)(1),
(2) Date: Sep. 24, 2021

(87) PCT Pub. No.: WO2020/200765
PCT Pub. Date: Oct. 8, 2020

(65) Prior Publication Data
US 2022/0228567 A1    Jul. 21, 2022

(30) Foreign Application Priority Data
Apr. 1, 2019   (EP) .................................. 19166615

(51) Int. Cl.
*F03D 17/00*   (2016.01)
*F03D 1/06*   (2006.01)
(Continued)

(52) U.S. Cl.
CPC ........... *F03D 17/00* (2016.05); *F03D 1/0675* (2013.01); *F03D 7/047* (2013.01); *F03D 80/00* (2016.05);
(Continued)

(58) Field of Classification Search
CPC ........ F03D 17/00; F03D 1/0675; F03D 7/047; F03D 80/00; F05B 2260/80;
(Continued)

(56) References Cited

U.S. PATENT DOCUMENTS

| 9,909,570 B2* | 3/2018 | Klitgaard ................ F03D 7/022 |
| 2004/0057828 A1* | 3/2004 | Bosche ................... F03D 7/046 |
| | | 416/31 |

(Continued)

FOREIGN PATENT DOCUMENTS

| CN | 102394331 A | 3/2012 |
| CN | 102628430 A | 8/2012 |

(Continued)

OTHER PUBLICATIONS

International Search Report & Written Opinion dated Jul. 17, 2020 for PCT/EP2020/057274.

*Primary Examiner* — Courtney D Heinle
*Assistant Examiner* — Andrew J Marien
(74) *Attorney, Agent, or Firm* — Schmeiser, Olsen & Watts LLP

(57) ABSTRACT

Provided is an apparatus for detecting properties of a rotor blade of a wind turbine, the apparatus including: at least one leaky feeder configured to be arranged around the tower, an electromagnetic transmitter connected to the at least one leaky feeder and configured for transmitting a first electromagnetic signal along the at least one leaky feeder, a reflector for diverting and/or focusing the first electromagnetic signal in a predetermined direction, thereby forming a reflected first electromagnetic signal, an electromagnetic receiver connected to the at least one leaky feeder and configured for receiving a second electromagnetic signal from the at least one leaky feeder, the second electromagnetic signal being reflected from the rotor blade, and a processing unit connected to the electromagnetic transmitter (Continued)

and the electromagnetic receiver and configured to determine the properties of the rotor blade by analysing the first electromagnetic signal and the second electromagnetic signal.

13 Claims, 4 Drawing Sheets

(51) Int. Cl.
  *F03D 7/04*  (2006.01)
  *F03D 80/00*  (2016.01)
  *H01Q 13/20*  (2006.01)
  *H04B 5/28*  (2024.01)

(52) U.S. Cl.
  CPC ..... *F05B 2260/80* (2013.01); *F05B 2270/329* (2013.01); *F05B 2270/805* (2013.01); *H01Q 13/203* (2013.01); *H04B 5/28* (2024.01)

(58) Field of Classification Search
  CPC ......... F05B 2270/329; F05B 2270/805; H01Q 13/203; H04B 5/0018
  See application file for complete search history.

(56) References Cited

U.S. PATENT DOCUMENTS

| | | | |
|---|---|---|---|
| 2010/0098541 A1* | 4/2010 | Benito | F03D 7/024 |
| | | | 416/1 |
| 2010/0124498 A1 | 5/2010 | Kabatzke | |
| 2011/0135466 A1* | 6/2011 | Latorre | F03D 17/00 |
| | | | 416/61 |
| 2011/0144815 A1* | 6/2011 | Neumann | F03D 13/20 |
| | | | 702/158 |
| 2012/0200444 A1 | 8/2012 | Andersen et al. | |
| 2013/0136594 A1 | 5/2013 | Casazza et al. | |
| 2016/0215763 A1* | 7/2016 | Vangen | F03D 1/0675 |
| 2020/0362826 A1* | 11/2020 | David | F03D 7/0236 |

FOREIGN PATENT DOCUMENTS

| | | |
|---|---|---|
| CN | 107 064 648 A | 8/2017 |
| EP | 2 864 632 A2 | 4/2015 |
| EP | 2864632 B1 | 4/2016 |
| EP | 3 043 064 A1 | 7/2016 |
| WO | 2012/032916 A1 | 3/2012 |
| WO | 2014/000744 A2 | 1/2014 |

\* cited by examiner

APPARATUS FOR AND METHOD OF DETECTING ONE OR MORE PROPERTIES OF A ROTOR BLADE DURING OPERATION OF A WIND TURBINE

CROSS-REFERENCE TO RELATED APPLICATIONS

This application claims priority to PCT Application No. PCT/EP2020/057274, having a filing date of Mar. 17, 2020, which claims priority to EP Application No. 19166615.5, having a filing date of Apr. 1, 2019, the entire contents both of which are hereby incorporated by reference.

FIELD OF TECHNOLOGY

The following relates to wind turbines. More specifically, the following relates to an apparatus for detecting one or more properties of a rotor blade during operation of a wind turbine. The following further relates to a wind turbine comprising such an apparatus and to a method of detecting one or more properties of a rotor blade during operation of a wind turbine.

BACKGROUND

In the above defined technical field, systems are known, which comprise a plurality of radar units operatively configured to emit and receive radar signals. The radar units are typically mounted on and around the wind turbine tower, the radar units being positioned so as to measure reflections of an emitted radar signal from the turbine blade. A processing unit is configured to receive measurement data from the radar unit and to determine, by analysis of Doppler shift, time of flight, phase and amplitude in received radar signals relative to transmitted signals due to movement of the blade towards or away from the turbine tower, the velocity of the blade in the direction towards or away from the turbine tower. This permits calculation of the trajectory and, in particular, the absolute speed and position of the blade.

Using radar units to measure blade position based on the Doppler Effect is for example described in EP 2864632 and permits to avoid the installation of other types of sensors on the blades or nacelle of the wind turbine. This reduces manufacturing and maintenance costs of the wind turbine, since sensors positioned on the tower are easier to replace in the field.

However, such a solution is not yet optimal considering that for rotating objects, like the rotor blades or the nacelles, installation of a plurality of radar units is required.

A single radar unit may in fact be used but only for detecting the passage of the blade at a single location. At least two radar units (horizontally mounted) are required for following the position of the blade around the nacelle yawing. One radar unit is able to detect the revolution of the blade at a specific position. More than two single radar units may be used for improving redundancy, resolution and confidence of the detection. However, this further increases costs and the need for software resources. Each radar unit requires a dedicated processing unit for analyzing the signals and deriving the position and speed of the blade.

Attempts using leaky feeders arranged e.g., around the wind turbine tower have been made but suffer from at least the drawback that the radiation pattern from a leaky feeder is not very well defined, and the efficiency of the antenna is lower than traditional antennas with higher gain. Thus, a reasonable signal to noise ratio requires the use of very strong signals and thus significant amounts of power and energy.

There may thus be a need for an improved way of efficiently detecting properties of a rotating rotor blade of a wind turbine.

SUMMARY

An aspect related to an apparatus for detecting one or more properties of a rotor blade during operation of a wind turbine, the wind turbine comprising a tower, a nacelle and the rotor blade. The apparatus comprises (a) at least one leaky feeder configured to be arranged around a circumference of the tower, (b) an electromagnetic transmitter connected to the at least one leaky feeder and configured for transmitting a first electromagnetic signal along the at least one leaky feeder, (c) a reflector for diverting and/or focusing the first electromagnetic signal in a predetermined direction, thereby forming a reflected first electromagnetic signal, (d) an electromagnetic receiver connected to the at least one leaky feeder and configured for receiving a second electromagnetic signal from the at least one leaky feeder, the second electromagnetic signal being reflected from the rotor blade when the reflected first electromagnetic signal hits the rotor blade, and (e) a processing unit connected to the electromagnetic transmitter and the electromagnetic receiver and configured to determine the one or more properties of the rotor blade by analysing the first electromagnetic signal and the second electromagnetic signal.

Aspects of embodiments of the invention are based on the idea that the first electromagnetic signal which is emitted by the at least one leaky feeder is diverted and/or focused by a reflector, such that a reflected first electromagnetic signal is formed and propagated in a predetermined direction, in particular towards a spatial position which the rotor blade will pass during rotation. In other words, the energy of the first electromagnetic signal is concentrated in the predetermined direction. Thereby, energy can be saved and the overall performance, in particular in terms of signal to noise ratio, can be significantly improved. Furthermore, the isolation between transmitter and receiver antenna will also be improved.

The electromagnetic transmitter and the electromagnetic receiver may be integrated in a single component, i.e., a transceiver comprising both functionalities.

According to an embodiment of the invention, the reflector is configured to be arranged between the circumference of the tower and the at least one leaky feeder.

In other words, the reflector is interposed between the at least one leaky feeder and the surface of the tower. This means that the at least one leaky feeder is arranged with a certain distance from the tower surface in order to provide the necessary space for the reflector.

According to a further embodiment of the invention, the at least one leaky feeder is configured to emit the first electromagnetic signal towards the tower.

Usually, a leaky feeder emits (or leaks) a signal from approximately half of its circumference. Here, the leaky feeder is oriented such that the leaky part (or side) of the leaky feeder points towards the tower (rather than away from it).

According to a further embodiment of the invention, the reflector comprises a single integral reflector unit.

In other words, the reflector is formed as a single reflector unit which can be arranged around the circumference of the tower in an appropriate manner such that the first electromagnetic signal from the at least one leaky feeder impinges on the reflector unit and is reflected in the predetermined direction.

The reflective surface of the reflector unit may have a varying geometry, in particular one surface geometry may be present in the vicinity of particular leaky sections of the at least one leaky feeder while another surface geometry may be present along the remainder of the reflector unit.

According to a further embodiment of the invention, the reflector comprises a plurality of reflector units configured to be distributed around the circumference of the tower.

In this case, each reflector unit should be arranged in the vicinity of a corresponding leaky portion or leaky section of the at least one leaky feeder.

The reflector unit for both transmitter and receiver antennas can be constructed in one piece containing both shapes for the transmitter and receiver antennas.

According to a further embodiment of the invention, the reflector is further configured to divert and/or focus the second electromagnetic signal towards a predetermined portion of the at least one leaky feeder.

In this embodiment, the reflector is further configured to direct the signal reflected from the rotor blade towards the at least one leaky feeder.

According to a further embodiment of the invention, the apparatus further comprises a reflector adjustment unit for adjusting the predetermined direction.

The reflector adjustment unit may in particular comprise electrical and/or mechanical elements for adjusting position and/or orientation of the reflector. Thereby, it is possible to optimize the functionality of the reflector.

According to a further embodiment of the invention, the at least one leaky feeder comprises a first leaky feeder and a second leaky feeder, the first leaky feeder being connected to the electromagnetic transmitter and the second leaky feeder being connected to the electromagnetic receiver.

In other words, the first leaky feeder serves as transmitting antenna and the second leaky feeder serves as receiving antenna.

According to a further embodiment of the invention, the at least one leaky feeder is geometrically configured to form an arc around the tower or a loop surrounding the tower.

Thereby, by arranging the at least one leaky feeder in a suitable height (e.g., corresponding to the height in which a particular rotor blade section, such as a tip or mid-section passes), reflections from the rotor blade will be received for any yaw angle (which may be set in dependency of the wind direction).

According to a further embodiment of the invention, the at least one leaky feeder and/or the electromagnetic transmitter and/or the electromagnetic receiver are installed on the tower or inside the tower.

Installing at least some of the parts inside the tower may be beneficial in protecting them from environmental influences as well as direct and indirect influence of a lightning strike.

In the case of detecting water waves or other items around the bottom of the tower the antennas and or transmitter and receiver can be placed on/in a support structure like a transition piece or a floating support structure.

According to a further embodiment of the invention, the first electromagnetic signal and the second electromagnetic signal are radar signals or ultrasonic signals.

According to a further embodiment of the invention, the at least one leaky feeder comprises a coaxial leaky cable or a leaky waveguide.

A coaxial leaky cable may in particular be suitable in implementations where the first and second electromagnetic signals are radar signals. A leaky waveguide or a leaky stripline may in particular be suitable for embodiments where the first and second electromagnetic signals have higher frequencies.

According to a further embodiment of the invention, the one or more properties of the rotor blade comprises one or more of a rotor blade position, a rotor blade speed, a rotor blade distance from tower, a rotor blade size, and a rotor blade soiling state or structural changes inside the blade(s).

In other words, the properties span from parameters relating to spatial position and movement of the blade to analysis of the rotor blade surface geometry and properties (which change in case of soiling).

According to a further embodiment of the invention, the apparatus further comprises a leaky feeder adjusting unit for adjusting an emission direction of the first electromagnetic signal from the at least one leaky feeder.

The leaky feeder adjustment unit may in particular comprise electrical and/or mechanical elements for adjusting position and/or orientation of the at least one leaky feeder. Thereby, it is possible to optimize the interaction with the reflector.

According to a further embodiment of the invention, the apparatus may comprise a plurality of leaky feeders arranged adjacent in such a way that beam forming can be provided.

By utilizing beam forming in combination with the reflector, a further increase in the signal to noise ratio can be obtained, even more energy can be saved, the reflector structure may be simplified, and the number of reflector units may even be reduced.

According to a second aspect of embodiments of the invention, a wind turbine is provided, the wind turbine comprising (a) a tower, (b) a nacelle, (c) at least one rotor blade, and (d) an apparatus according to the first aspect or any of the embodiments discussed above, the apparatus being arranged to detect one or more properties of the rotor blade during operation of the wind turbine.

The wind turbine of this aspect benefits from the advantages of the apparatus according to the first aspect as discussed above.

According to a second aspect of embodiments of the invention, a method of detecting one or more properties of a rotor blade during operation of a wind turbine is provided, the wind turbine comprising a tower and a nacelle. The method comprises (a) arranging at least one leaky feeder around a circumference of the tower, (b) transmitting a first electromagnetic signal along the at least one leaky feeder, (c) diverting and/or focusing the first electromagnetic signal in a predetermined direction, thereby forming a reflected first electromagnetic signal, (d) receiving a second electromagnetic signal from the at least one leaky feeder, the second electromagnetic signal being reflected from the rotor blade when the reflected first electromagnetic signal hits the rotor blade, and (e) determining the one or more properties of the rotor blade by analysing the first electromagnetic signal and the second electromagnetic signal.

This aspect of embodiments of the invention is essentially based on the same idea as the first aspect discussed above.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention are not limited to the described exemplary embodiments.

BRIEF DESCRIPTION

Some of the embodiments will be described in detail, with references to the following Figures, wherein like designations denote like members, wherein.

DETAILED DESCRIPTION

Figure 1:
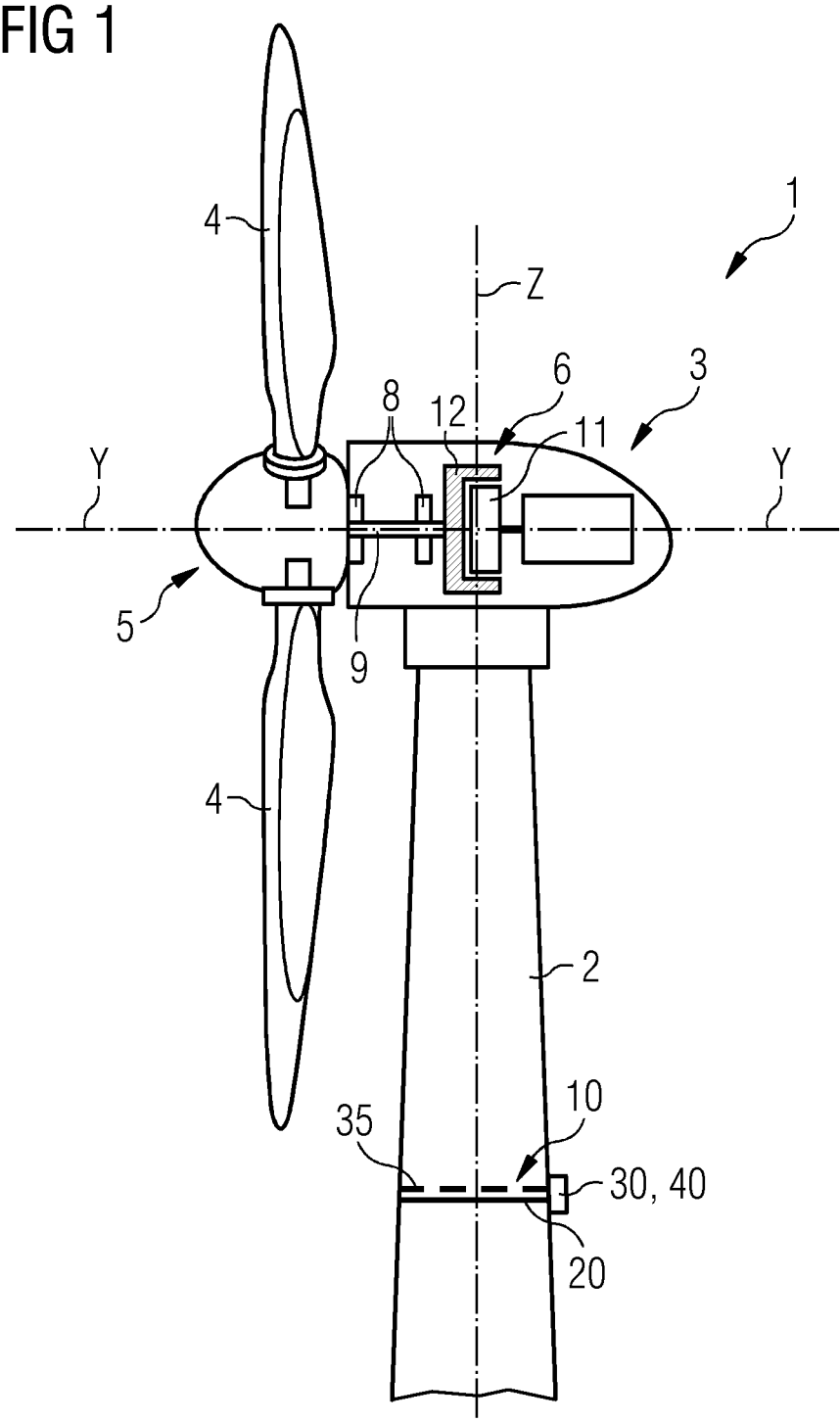
FIG. 1 shows a schematic section of a wind turbine including embodiments of the present invention.

FIG. 1 shows a partial cross-sectional view of a wind turbine 1 including an apparatus 10 for detecting one or more properties of a rotor blade 4 in accordance with embodiments of the invention.

More specifically, the wind turbine 1 comprises a tower 2, which is mounted on a non-depicted fundament. A nacelle 3 is arranged on top of the tower 2. In between the tower 2 and the nacelle 3 a yaw angle adjustment device (not shown) is provided, which is capable of rotating the nacelle around a vertical yaw axis Z. The wind turbine 1 further comprises a wind rotor 5 having one or more rotor blades 4 (in the perspective of FIG. 1 only two blades 4 are visible). The wind rotor 5 is rotatable around a rotational axis Y. In general, when not differently specified, the terms axial, radial and circumferential in the following are made with reference to the rotational axis Y. The rotor blades 4 extend radially with respect to the rotational axis Y. The wind turbine 1 comprises an electric generator 6 having a stator 11 and a rotor 12. The rotor 12 is rotatable with respect to the stator 11 about the rotational axis Y to generate electrical power. The electric generator 6 and the generation of electrical power through embodiments of the present invention is not a specific object of embodiments of the present invention and will therefore not be described in further detail.

The apparatus 10 for detecting one or more properties of the one or more rotor blades 4 during operation of the wind turbine comprises: at least one leaky feeder 20 arranged around a circumference of the tower (2), an electromagnetic transmitter 30 connected to the at least one leaky feeder 20, a reflector 35 for diverting and/or focusing electromagnetic signals leaked or emitted by the at least one leaky feeder 20, an electromagnetic receiver 40 connected to the least one leaky feeder 20, at least one final resistance/impedance 50 or termination connected to the least one leaky feeder 20, and a processing unit 300 connected to the electromagnetic transmitter 30 and the electromagnetic receiver 40.

The leaky feeder 20 is an elongate communication component, which leaks an electromagnetic wave that is transmitted along the component. The leaky feeder 20 may be constituted by a leaky coaxial cable or a leaky waveguide or a leaky strip line. The leaky feeder 20 is connected to an electromagnetic transmitter 30 in order to transmit a first electromagnetic signal 100 along the leaky feeder 20.

Figure 2:
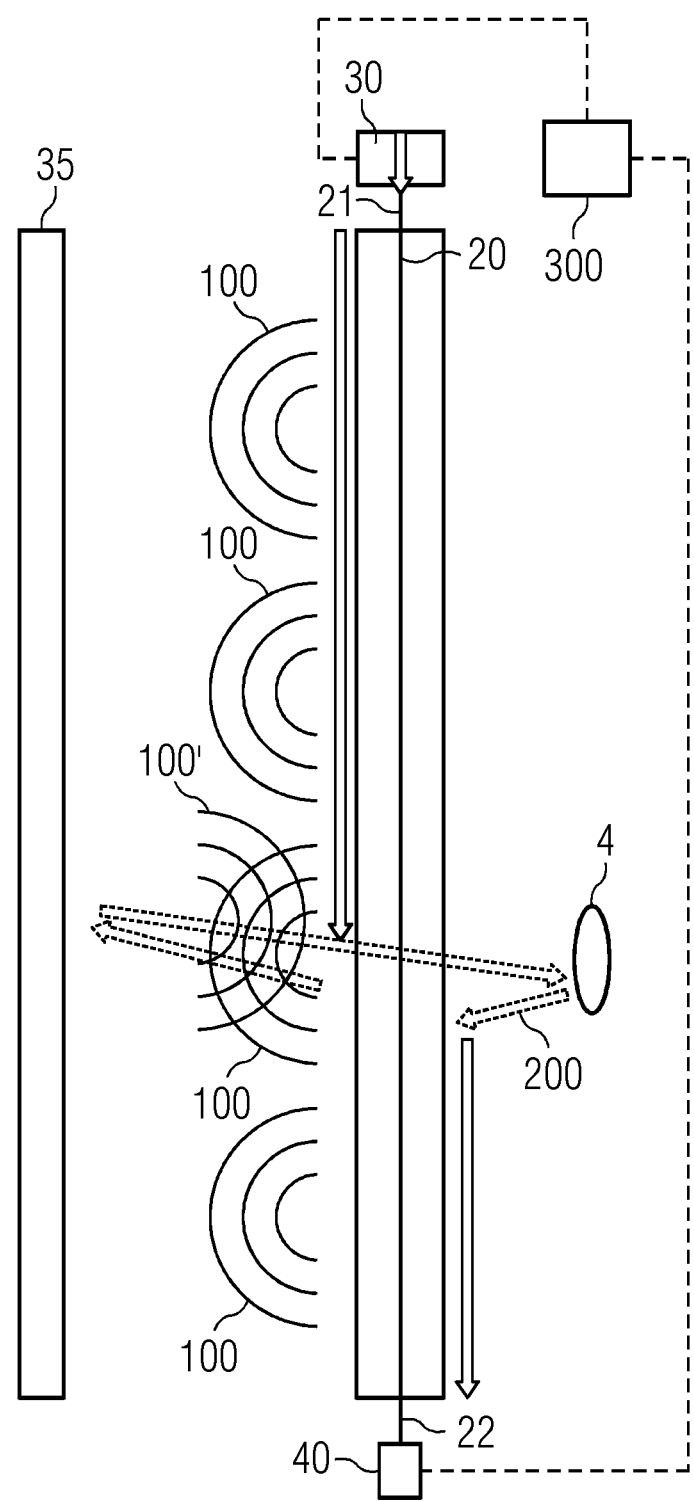
FIG. 2 shows a schematic view of an apparatus according to an exemplary embodiment of the present invention.

Referring also to FIG. 2, the leaky feeder 20 comprises a plurality of slots (not shown) that allow the first electromagnetic signal 100 to leak out of the leaky feeder 20 along its entire length towards the reflector and on towards the rotor blade 4 (target object). The slots may, according to possible embodiments, be regularly distributed along the length of the leaky feeder 20. According to other possible embodiments of the present invention, the leaky feeder 20 is a normal coaxial cable with low optical coverage of the outside conductor (mesh or slots/apertures), which also leaks electromagnetic waves.

The leaky feeder 20 may be provided with a heating system (not shown) in case severe over icing conditions are possible. Heating may be provided by air flowing between inside and outside conductors or by electrical current which runs in inner or outer conductors of the leaky feeder 20.

The first electromagnetic signal 100 may, according to possible embodiments, be a radar signal or an ultrasonic signal. In cases where the first electromagnetic signal 100 is a radar signal or an ultrasonic signal, the leaky feeder 20 may be configured as a coaxial leaky cable. According to other embodiments, particularly where the first electromagnetic signal 100 is of higher frequency, the leaky feeder 20 may be configured as a leaky waveguide.

In general, according to different embodiments of the present invention, the first electromagnetic signal 100 may be of any frequency, provided that it can be transmitted to the rotor blade 4 and be reflected by the reflector 35 and the rotor blade 4.

When the reflected first electromagnetic signal 100' impinges on or hits the rotor blade 4, a reflected second electromagnetic signal 200 is transmitted towards the leaky feeder. The plurality of slots of the leaky feeder 20 allow the second electromagnetic signal 200 to leak into the leaky feeder 20 and propagate towards the electromagnetic receiver 40.

The reflector 35 is arranged in the vicinity of the leaky feeder 20 in order to divert and/or focus the first electromagnetic signal 100 leaked from the leaky feeder 20 in a predetermined direction towards a position, where the rotor blade 4 will be passing by. In other words, the reflector 35 forms a reflected (and focused) first electromagnetic signal 100' which in turn is reflected by the rotor blade and back towards the leaky feeder 20 as the second electromagnetic signal 200. By focusing the leaked first electromagnetic signal 100, an improved signal to noise ratio may be obtained with less energy consumption. For this to work optimally, it is important to arrange the leaky feeder 20 and the reflector 35 in an appropriate spatial relation to each other such that leaky feeder 20 does not block or attenuate the reflected first electromagnetic signals 100'. Isolation between receiver (Rx) and transmitter (Tx) signals is improved as well.

The processing unit 300 analyses the first electromagnetic signal 100 and the second electromagnetic signal 200 for determining the properties of the rotor blade 4, such as position, speed, distance from tower, direction, size and soiling state of the rotor blade 4. According to known (radar) principles with regard to amplitude, phase, Doppler effect and ToF (Time of Flight), the processing unit 300 is able to compare the first electromagnetic signal 100 and the second electromagnetic signal 200 caused by a moving object (i.e., the rotor blade 4) and consequently to determine the speed and/or position and/or direction and/or size of such object. The position of the object may be an angle with respect to a rotational axis or the three-dimensional position with respect to a system of Cartesian axes.

As shown in FIG. 2, an embodiment of the apparatus 10 may comprise only one leaky feeder 20. The leaky feeder 20 extends between a first end 21 and a second end 22. The first end 21 is connected to an electromagnetic transmitter 30. The second end 22 is connected to an electromagnetic receiver 40. The apparatus 10 is used for detecting the position of a rotor blade 4 of the wind turbine 1. According to embodiments of the present invention, the positions of all the rotational blades 4 of the wind turbine 1 are detectable.

The leaky feeder 20 must not be connected directly to the electromagnetic transmitter 30 and to the electromagnetic receiver 40, e.g., a non-leaky feeder cable (i.e., a normal coaxial cable) may be interposed between the leaky feeder 20 and the electromagnetic transmitter 30 and/or the electromagnetic receiver 40. A normal coaxial cable may be connected directly to the electromagnetic transmitter 30 and to the electromagnetic receiver 40 or it may be used for interconnection.

According to other embodiments of the present invention, the target object may be the nacelle 2 for the detection of the position of the nacelle about the vertical yaw axis Z.

According to further embodiments of the present invention, other target objects may be detected in an area comprising a wind turbine 1, for example animals or intruders or changing waves (in offshore applications).

The leaky feeder 20 and reflector 35 of FIG. 2 are shown as rectilinear elements. Although rectilinear elements may be used, it should be understood that the leaky feeder 20 and reflector 35 may be geometrically configured as arcs or loops surrounding the circumference of the tower 2.

Figure 3:
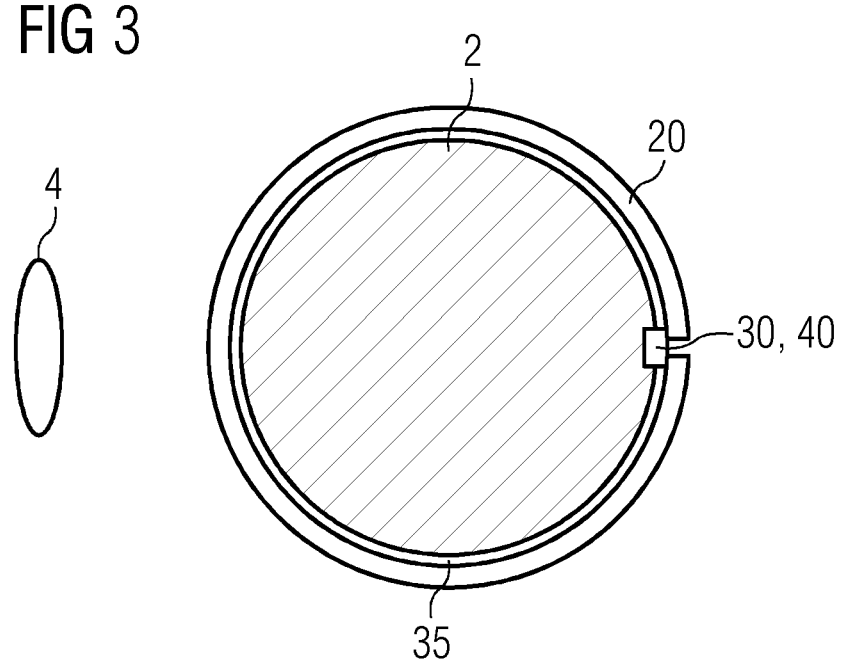
FIG. 3 shows another schematic view of the apparatus of FIG. 2.

Such a configuration is shown in FIG. 3, where both the reflector 35 and the leaky feeder 20 are geometrically configured as concentric circular loops surrounding the tower 2. Here, the reflector 35 is arranged directly on the outer surface of the tower 2 and the leaky feeder is arranged with some distance to both the tower surface and the reflector 35. Generally, the reflector 35 and the leaky feeder 20 will be arranged at somewhat different heights in order to prevent that the leaky feeder 20 blocks the focused signal from the reflector 35.

According to other embodiments of the present invention, any other geometrical configuration is possible, provided that the first electromagnetic signal 100 can be transmitted towards the target object and the second electromagnetic signal 200 can be reflected by the target object towards the leaky feeder 20.

The leaky feeder 20, the electromagnetic transmitter 30, and the electromagnetic receiver 40 are installed on the tower 2.

According to other embodiments of the present invention, the leaky feeder 20, the electromagnetic transmitter 30, and the electromagnetic receiver 40 may not be directly installed on the wind turbine 1, but instead distanced from the wind turbine 1.

Figure 4:
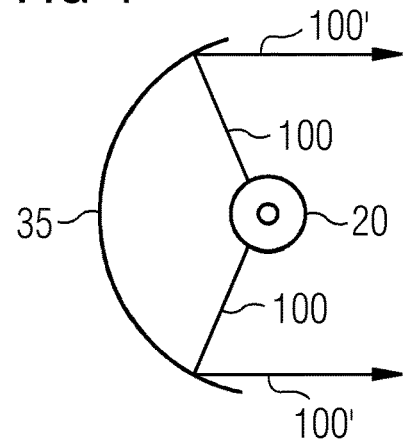
FIG. 4 shows a reflector according to an exemplary embodiment of the invention.
Figure 5:
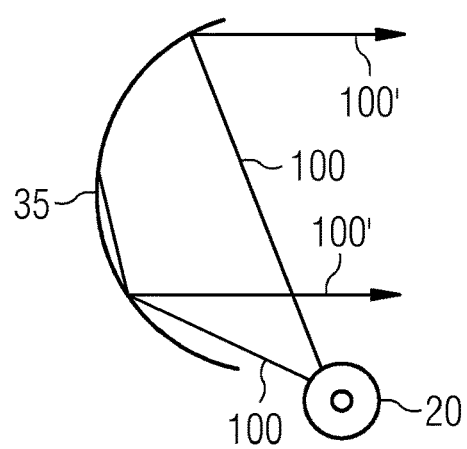
FIG. 5 shows a reflector according to a further exemplary embodiment of the invention.
Figure 6:
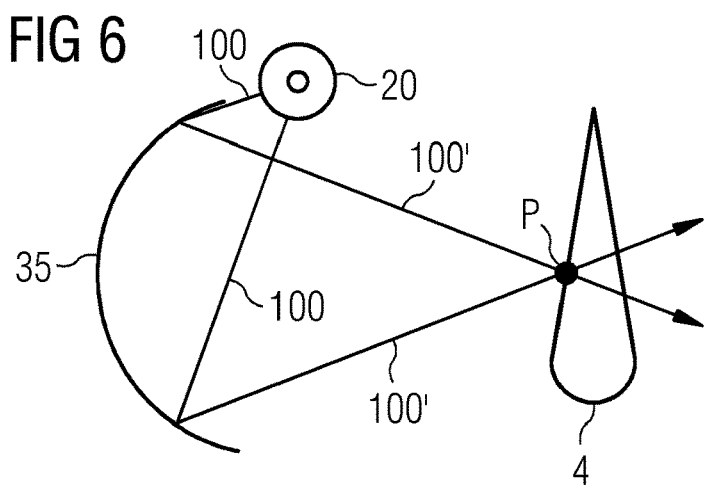
FIG. 6 shows a reflector according to a further exemplary embodiment of the invention.

FIG. 4, FIG. 5, and FIG. 6 show various exemplary embodiments of a reflector 35. In the exemplary embodiment shown in FIG. 4, the leaky feeder 20 is arranged in a central focus point of the reflector 35. In the exemplary embodiment shown in FIG. 5, the leaky feeder 20 is arranged in an offset focus point of the reflector 35. In the exemplary embodiment of FIG. 6, a bi-focus arrangement is used where the leaky feeder 20 is arranged in a first focus point of the reflector 35 while a second focus point is positioned where the rotor blade 4 (or another object that is to be detected) is expected to pass by.

According to other embodiments of the present invention (not shown, the apparatus 10 may comprise a plurality of leaky feeders 20 with more than two leaky feeders 20. Such plurality of leaky feeders 20 comprising a first and a second group of leaky feeders 20 respectively connected to one or more electromagnetic transmitters 30 and to one or more electromagnetic receivers 40. Each of the plurality of leaky feeders 20 may be conveniently geometrically configured for optimally following the trajectories of the target objects or of a plurality of target objects.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for detecting one or more properties of a rotor blade during operation of a wind turbine, the wind turbine including a tower, a nacelle and the rotor blade, the apparatus comprising:
    at least one leaky feeder configured to be arranged around a circumference of the tower,
    an electromagnetic transmitter connected to the at least one leaky feeder and configured for transmitting a first electromagnetic signal along the at least one leaky feeder,
    a reflector for diverting and/or focusing the first electromagnetic signal in a predetermined direction, thereby forming a reflected first electromagnetic signal,
    an electromagnetic receiver connected to the at least one leaky feeder and configured for receiving a second electromagnetic signal from the at least one leaky feeder, the second electromagnetic signal being reflected from the rotor blade when the reflected first electromagnetic signal hits the rotor blade, and
    a processing unit connected to the electromagnetic transmitter and the electromagnetic receiver and configured to determine the one or more properties of the rotor blade by analysing the first electromagnetic signal and the second electromagnetic signal.

2. The apparatus according to claim 1, wherein the reflector is configured to be arranged between the circumference of the tower and the at least one leaky feeder.

3. The apparatus according to claim 1, wherein the at least one leaky feeder is configured to emit the first electromagnetic signal towards the tower.

4. The apparatus according to claim 1, wherein the reflector comprises a single integral reflector unit or a plurality of reflector units configured to be distributed around the circumference of the tower.

5. The apparatus according to claim 1, wherein the reflector is further configured to divert and/or focus the second electromagnetic signal towards a predetermined portion of the at least one leaky feeder.

6. The apparatus according to claim 1, wherein the at least one leaky feeder comprises a first leaky feeder and a second leaky feeder, the first leaky feeder being connected to the electromagnetic transmitter and the second leaky feeder being connected to the electromagnetic receiver.

7. The apparatus according to claim 1, wherein the at least one leaky feeder is geometrically configured to form an arc around the tower or a loop surrounding the tower.

8. The apparatus according to claim 1, wherein the at least one leaky feeder and/or the electromagnetic transmitter and/or the electromagnetic receiver are installed on the tower or inside the tower.

9. The apparatus according to claim 1, wherein the first electromagnetic signal and the second electromagnetic signal are radar signals or ultrasonic signals.

10. The apparatus according to claim 1, wherein the at least one leaky feeder is a coaxial leaky cable or a leaky waveguide.

11. The apparatus according to claim 1, wherein the one or more properties of the rotor blade comprises one or more of a rotor blade position, a rotor blade speed, a rotor blade distance from tower, a rotor blade size, a rotor blade soiling state, or structural changes inside the rotor blade.

12. A wind turbine comprising:
a tower,
a nacelle,
at least one rotor blade, and
an apparatus, the apparatus
having:
at least one leaky feeder configured to be arranged around a circumference of the tower,
an electromagnetic transmitter connected to the at least one leaky feeder and configured for transmitting a first electromagnetic signal along the at least one leaky feeder,
a reflector for diverting and/or focusing the first electromagnetic signal in a predetermined direction, thereby forming a reflected first electromagnetic signal,
an electromagnetic receiver connected to the at least one leaky feeder and configured for receiving a second electromagnetic signal from the at least one leaky feeder, the second electromagnetic signal being reflected from the rotor blade when the reflected first electromagnetic signal hits the rotor blade, and
a processing unit connected to the electromagnetic transmitter and the electromagnetic receiver and configured to determine the one or more properties of the rotor blade by analysing the first electromagnetic signal and the second electromagnetic signal.

13. A method of detecting one or more properties of a rotor blade during operation of a wind turbine, the wind turbine comprising a tower and a nacelle, the method comprising:
arranging at least one leaky feeder around a circumference of the tower,
transmitting a first electromagnetic signal along the at least one leaky feeder,
diverting and/or focusing the first electromagnetic signal in a predetermined direction, thereby forming a reflected first electromagnetic signal,
receiving a second electromagnetic signal from the at least one leaky feeder, the second electromagnetic signal being reflected from the rotor blade when the reflected first electromagnetic signal hits the rotor blade, and
determining the one or more properties of the rotor blade by analysing the first electromagnetic signal and the second electromagnetic signal.

* * * * *